Patented July 29, 1952

2,604,664

UNITED STATES PATENT OFFICE 2,604,664

PREPARATION OF SPONGE RUBBER FROM FOAMED LATEX

Wilbur F. Jordan, Akron, Ohio, assignor to Firestone Tire & Rubber Company, Akron, Ohio, a corporation of Ohio No Drawing. Application February 3, 1950, Serial No. 142,349

2 Claims. (Cl. 18—53)

This invention relates to the preparation of sponge rubber from foamed latices. More particularly, it relates to the production of sponge from foamed natural rubber latex.

The invention has particular reference to the use of a dope on the mold in or on which foamed latex is cast and set prior to being cured. The dopes of this invention comprise different ingredients, but each produces a like effect on the foamed latex with which it comes into contact. Each breaks the latex down in a similar manner to produce the same uniform, velvety skin on the sponge. Each, when applied to the mold surface, forms a continuous and homogeneous film over the mold surface, thus insuring constant conditions of wetability and surface porosity. Each aids in the complete release of the formed sponge from the mold. Each produces a sponge which is smooth in appearance, velvety to the touch, and yet of sufficient porosity to allow passage of air through its surface in either direction.

The foamed latices which are used in carrying out the invention may be produced in any of the usual ways. When poured into a mold, the foam which contacts the mold breaks down. Different surfaces effect a different breakdown, and determine the nature of the surface of the sponge produced. If the latex is poured into a mold of aluminum, steel, a chromium-plated material, aluminum alloy or a nonmetal, such as glass, etc., without first treating the surface of the mold, the surface of the cured sponge which has been next to the mold is nonporous and harsh and leathery. If the mold be treated with a latex coagulant before filling it with latex, the skin of the resulting sponge is harsh, and although porous, the size of the holes is not uniform.

The breakdown of the foamed latex at the mold surface can be controlled by merely having the mold wet with a film of water at the time the foam is poured into it. This produces a sponge with an impervious, tough skin.

When the mold surface is covered with glycerin or urea as contemplated by this invention, the surface coatings absorb moisture. This moisture condition at the surface of the mold breaks the foam, but only at its extreme surface as if each individual foam bubble were pierced on one face. The skin of the resulting cured sponge has a uniformly porous surface, such as would be expected when a layer of the bubbles of foam, only one bubble deep, has been broken down.

Lanolin similarly gives a skin of uniform porosity by breaking down only the extreme surface layer of the foamed latex bubbles. However, the porosity and pore size can be controlled by the concentration of the lanolin used in the dope.

Mold dopes containing lanolin, glycerin and urea, respectively, all produce a cured sponge the skin of which is uniformly porous, smooth in appearance, and velvety to the touch. Each of these dopes provides complete release of the cured sponge from the mold. They give a continuous and homogeneous film over the mold surface. The lanolin and glycerin dopes cause the wet, uncured latex foam gel to adhere to the mold surface and prevent separation from the mold surface which would result in depressed areas on the finished sponge surface. The lanolin dope is used to advantage with saturated steam cures and hot water cures. The glycerin dope is used under conditions of dry heat, such as are encountered when superheated steam is used for curing.

When the foamed latex is cured in individual molds, there is the possibility of mold separation as previously described, and lanolin and glycerin are used to prevent this. When the foamed latex is cured on a belt as a continuous slab, there is no possibility of such mold separation, and urea dopes have been found particularly useful. The urea dope is applied to a metal belt before the foamed latex is poured onto it. For a thin slab the belt need have no sides. For thicker slabs it is customary to provide sides of hard rubber or the like between which the belt moves. There is sliding contact between the foam and these sides, but such contact is intermittent rather than continuous. The sides lead into an oven or the like where the foam is set. The belt carries the foamed latex through the oven where it is subjected to dry heat which gels the foam without curing. At the end of the oven the belt passes into a tank of boiling water in which the cure takes place. The plate-like crystals of the urea deposited on the belt form a continuous coating which is dissolved substantially instantaneously when the belt enters the water. The gelled foam is thus released from the belt and floats off on the surface of the water. The release of the foam must be substantially instantaneous to prevent distortion of the gel.

In general, any of the mold dopes may be applied by swabbing, spraying, brushing or otherwise applying to the mold a solution of the dope in a solvent which quickly evaporates, leaving a layer of the dope on the mold surface. In general, the amount of the dope material used in the solution will not exceed about 8 to 10 per cent or more although any concentration may be employed, and material such as glycerin or lanolin might be employed without solution although solutions make it possible to apply a small amount of the dope evenly with ease. The following examples are illustrative of dopes which may be employed:

I. Lanolin dope: Parts by weight
Anhydrous lanolin ---------------------- 2
Carbon tetrachloride ------------------- 98

II. Lanolin dope: Parts by weight
Anhydrous lanolin ---------------------- 25
Carbon tetrachloride ------------------- 37.5
Gasoline ------------------------------- 37.5

III. Urea dope: Parts by weight
Urea ----------------------------------- 2
Alcohol -------------------------------- 98

IV. Glycerin dope: Parts by weight
Glycerine ------------------------------ 5
Alcohol -------------------------------- 95

Although the dopes are designed particularly for use with foamed latex obtained from natural rubber latex, they may be used with foamed synthetic latices. For instance, the lanolin dope produces beneficial results when used on a mold in which a foamed latex of polymerized chloroprene is cured. Any foamed latex may be employed. The following is representative:

*Formula A*

Parts
Natural latex solids (in 62 per cent aqueous latex) -------------------------------- 100
Sulfur in 50% aqueous dispersion ----------- 2
Piperidinium pentamethylene dithiocarbamate (in 40 per cent aqueous dispersion) --- 0.5
Mercaptobenzothiazole ---------------------- 0.5
Sym. di-beta naphthyl paraphenylenediamine -------------------------------------- 1
Water, sufficient to yield composition with 57 per cent solids content

*Formula B*

Parts
Aluminum sulfate --------------------------- 3
Zinc oxide in 40 per cent aqueous dispersion -- 5

The ingredients of Formula A are blended together and then whipped into a foam. Formula B, which serves as a gelling agent, is then added and the mixture introduced into the mold.

If the foamed latex is to be poured into individual molds the surfaces are first treated with the mold dope and the solvent of the dope is allowed to evaporate. The latex is allowed to set for about twelve minutes and then subjected to open steam at 100° C. for 35 minutes to cure. In the continuous process in which a metal belt is used, the foamed latex is poured onto the belt.

Thus, it is seen that any relatively low boiling solvent which will quickly volatilize may be used. Mixed solvents may be employed. The proportion of solute and solvent may vary. Although the specific examples relate to natural rubber latex, GR-S latex and mixtures with natural latex may also be used in accordance with the invention. Other details of the specification may be varied without departing from the invention.

What I claim is:

1. The method of curing foamed latex in individual molds which comprises covering the mold surfaces with lanolin, pouring in the foamed latex, setting and curing.

2. The method of curing foamed latex which comprises gelling the foamed latex in contact with a mold surface coated with lanolin, and vulcanizing the gelled foam.

WILBUR F. JORDAN.

REFERENCES CITED

The following references are of record in the file of this patent:

UNITED STATES PATENTS

| Number | Name | Date |
|---|---|---|
| 133,515 | Aubin | Dec. 3, 1872 |
| 565,590 | Ballam | Aug. 11, 1896 |
| 1,985,045 | Madge | Dec. 18, 1934 |
| 2,099,028 | Sibley | July 23, 1935 |
| 2,308,951 | Novotny | Jan. 19, 1943 |
| 2,476,827 | Wohler | July 19, 1949 |

OTHER REFERENCES

"Wool Wax," Gillespie, 1948, pages 49 and 55.